United States Patent
Sonoda

(10) Patent No.: US 6,920,950 B2
(45) Date of Patent: Jul. 26, 2005

(54) AIR INTAKE SYSTEM STRUCTURE OF SCOOTER TYPE VEHICLE

(75) Inventor: Yuji Sonoda, Hammatsu (JP)

(73) Assignee: Suzuki Motor Corporation, Hamamatsu (JP)

( * ) Notice: Subject to any disclaimer, the term of this patent is extended or adjusted under 35 U.S.C. 154(b) by 104 days.

(21) Appl. No.: 10/421,227

(22) Filed: Apr. 23, 2003

(65) Prior Publication Data

US 2003/0213627 A1 Nov. 20, 2003

(30) Foreign Application Priority Data

May 17, 2002 (JP) ........................................ 2002-143089

(51) Int. Cl.[7] .............................................. B60K 13/02
(52) U.S. Cl. ..................................................... 180/68.3
(58) Field of Search ................................ 180/68.3, 218, 180/219, 225, 229; 123/41.56, 198 E

(56) References Cited

U.S. PATENT DOCUMENTS

| 4,733,639 | A | | 3/1988 | Kohyama et al. | |
|---|---|---|---|---|---|
| 2003/0213627 | A1 | * | 11/2003 | Sonoda | 180/68.3 |
| 2005/0051375 | A1 | * | 3/2005 | Momosaki | 180/219 |

FOREIGN PATENT DOCUMENTS

| EP | 0500140 A1 | 8/1992 |
|---|---|---|
| FR | 2748702 | 11/1997 |
| JP | 57-18451 | 1/1982 |
| JP | 9-242629 | * 9/1997 |
| JP | 10-196478 | 7/1998 |
| JP | 2000-53055 | 2/2000 |
| JP | 2000-355292 | * 12/2000 |
| JP | 2002-68061 | 3/2002 |

OTHER PUBLICATIONS

Patent Abstracts of Japan for JP 2002–068061 published on Mar. 8, 2002.
Patent Abstracts of Japan for JP 10–196478 published on Jul. 28, 1998.
Patent Abstracts of Japan for JP 2000–053055 published on Feb. 22, 2000.
Patent Abstracts of Japan for JP 57–018451 published on Jan. 30, 1982.

* cited by examiner

*Primary Examiner*—Bryan Fischmann
(74) *Attorney, Agent, or Firm*—Darby & Darby

(57) ABSTRACT

An engine unit is supported by a body frame, and a front body portion is covered with a cowling. This cowling is made wider than the body frame to form a space in the vehicle widthwise direction between the body frame and cowling, and an air, cleaner unit is accommodated in this space. The air cleaner unit has a substantially flat filter, a filter support portion, and a filter insertion hole. The attachment direction of the filter is set in its longitudinal direction, and the filter insertion hole is formed in a position corresponding to the end face of the filter when it is attached. The filter, the filter support portion, and air cleaner lid member divide the air cleaner main body into a clean chamber and dirty chamber.

23 Claims, 7 Drawing Sheets

AIR INTAKE SYSTEM STRUCTURE OF SCOOTER TYPE VEHICLE

CROSS-REFERENCE TO RELATED APPLICATIONS

This application is based upon and claims the benefit of priority from the prior Japanese Patent Application No. 2002-143089, filed on May 17, 2002, the entire contents of which are incorporated herein by reference.

BACKGROUND OF THE INVENTION

1. Field of the Invention

The present invention relates to an air intake system structure for supplying air to an engine unit in a motorcycle such as a scooter type vehicle.

2. Description of the Related Art

The basic structure of a scooter type vehicle of this sort is as follows. A floor tunnel is formed between right and left low-floor footrests formed between a front wheel steering unit and a driver's seat. An engine unit is placed in this floor tunnel and covered with a floor tunnel cover. Also, a leg shield connects to the front edges of the footrests and floor tunnel cover.

In a scooter type vehicle in which the engine unit is mounted in the floor tunnel between the footrests as described above, the engine unit is so mounted that its cylinder axis is substantially horizontal and slightly inclined forward and upward. In the front portion of the vehicle, metering instruments, a head lamp, and the like are arranged. The vehicle front portion including these parts is covered with a cowling. In addition, an air cleaner unit for supplying air to the cylinder is connected to the engine unit.

Unfortunately, if particularly a sufficiently large air cleaner capacity is to be secured in this conventional scooter type vehicle, the size of the cowling or the size of the body of the vehicle is increased because the metering instruments, head lamp, and the like are arranged in the vehicle front portion. Also, especially when the air cleaner is mounted above the engine unit and below the seat, the width of the floor tunnel immediately above the engine unit increases. This not only has influence on the driver's riding posture but also increases the size of the body. Furthermore, since the seat height increases, so-called foot resting stability is affected, and the capacity of the trunk after the seat is reduced. Regardless of the position of the air cleaner unit, components of the air cleaner unit, such as a filter and the like, require maintenance. For this purpose, the cowling, seat, or the like must be removed, and this makes maintenance difficult.

SUMMARY OF THE INVENTION

The present invention has been made in consideration of the above situation, and has its object to provide an air intake system structure for a scooter type vehicle which can be very easily used and handled while the air cleaner capacity is effectively and appropriately ensured.

According to the present invention, there is provided an air intake system structure for supplying air to an engine unit of a scooter type vehicle in which the engine unit is supported on a body frame and a front body portion is covered with a cowling, wherein the cowling is made wider than the body frame to form a space in a vehicle widthwise direction between the body frame and the cowling, and an air cleaner unit is accommodated in the space.

According to another aspect of the air intake system structure of the present invention, the air cleaner unit comprises a substantially flat filter, filter support portion, and filter insertion hole. The attachment direction of the filter is set in a plate surface (longitudinal) direction thereof, the filter insertion hole is formed in a position corresponding to an end face of the filter when the filter is attached, and the filter, the filter support portion, and an air cleaner lid member divide an air cleaner main body into a clean chamber and dirty chamber.

According to another aspect of the present invention, the air intake system structure further includes a mounting support portion for mounting a fuse box outside the air cleaner lid member.

According to another aspect of the present invention, the air intake system structure further includes a cover member connected to the cowling and covering a rear portion of the air cleaner unit, and a maintenance hole and a maintenance lid thereof are formed in the direction of arrangement of the filter and air cleaner lid member.

According to another aspect of the air intake system structure of the present invention, an air intake system including an air intake pipe is connected to the engine unit mounted within a width of the body frame. An air chamber is connected to an upstream side of the air intake pipe and housed within the width of the body frame. The air cleaner unit is placed in at least one of two outside spaces of the body frame, and, in an appropriate portion of the body frame, the air cleaner unit is connected to the air chamber.

According to another aspect of the air intake system structure of the present invention, a portion of the cowling for accommodating the air cleaner unit is formed to be long in the longitudinal direction and vertical direction and narrow in the widthwise direction. The portion of the cowling for accommodating the air cleaner unit is disposed in front of the air cleaner and is partially extended downward to form a leg shield. A space occupied by the driver is formed below the air cleaner unit.

According to another aspect of the air intake system structure of the present invention, the air cleaner unit is placed on one side of the vehicle in the vehicle widthwise direction, and a utility box is formed in a space on the other side of the vehicle.

In the present invention, a cowling is made wider than a body frame to form a space in the body widthwise direction between the body frame and cowling, and an air cleaner unit is accommodated in this space. Therefore, even when the projected area of the cowling is large, the air cleaner unit can be effectively mounted without wasting any space, and the capacity of this air cleaner unit can be effectively and appropriately ensured.

This arrangement, particularly, the air cleaner unit has a substantially flat filter, filter support portion, and filter insertion hole. The attachment direction of the filter is set in its plate surface (longitudinal) direction, and the filter insertion hole is formed in a position corresponding to the end face of the filter when it is attached. Accordingly, when a filter element or the like is to be replaced, this replacement can be smoothly and easily performed through a maintenance hole formed behind the air cleaner unit.

DETAILED DESCRIPTION OF THE PREFERRED EMBODIMENTS

A preferred embodiment of an air intake system structure for a scooter type vehicle according to the present invention will be described below with reference to the accompanying drawings.

Figure 1:
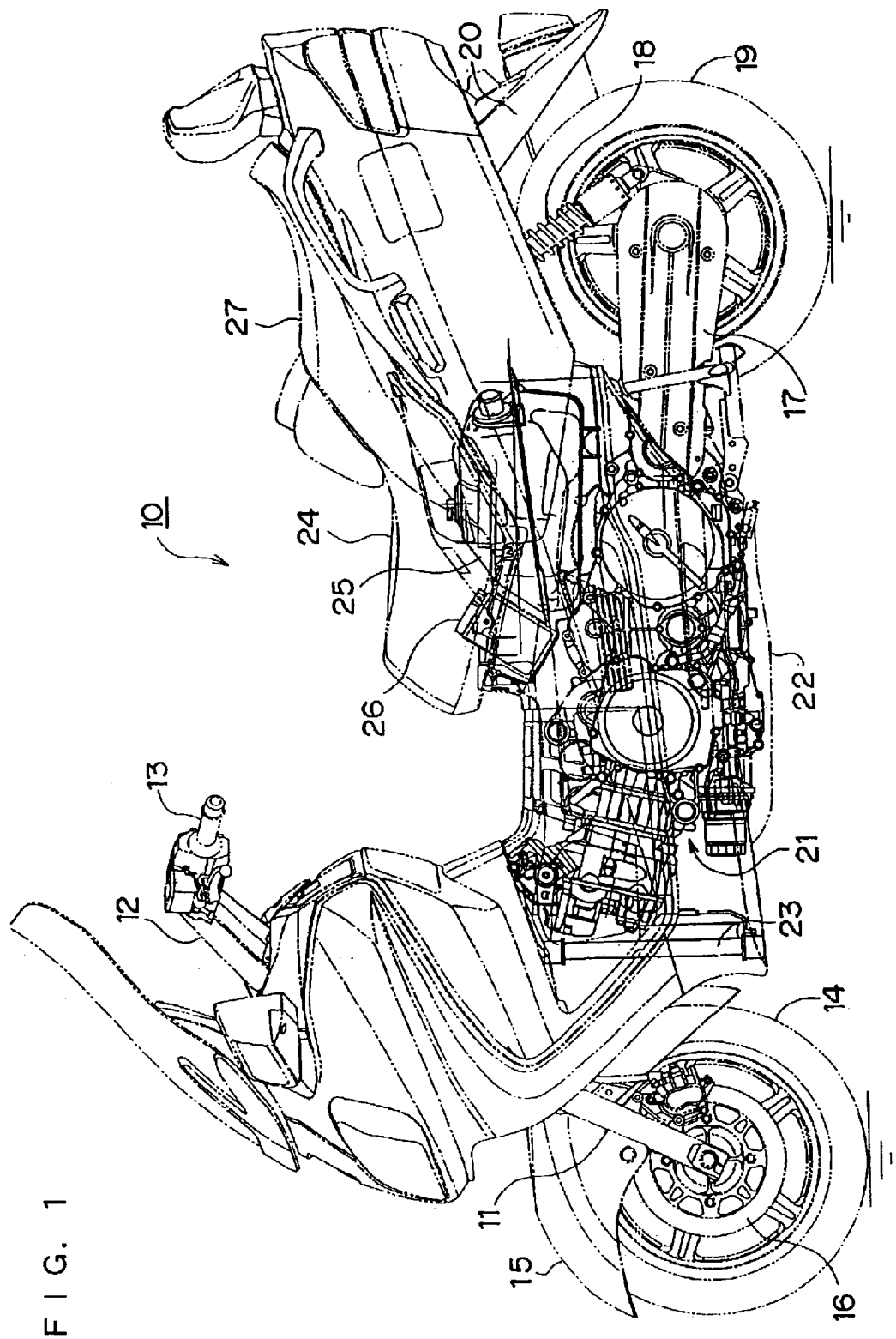
FIG. 1 is a side view showing the overall arrangement of a scooter type vehicle according to an embodiment of an air intake system structure for a scooter type vehicle of the present invention.
Figure 2:
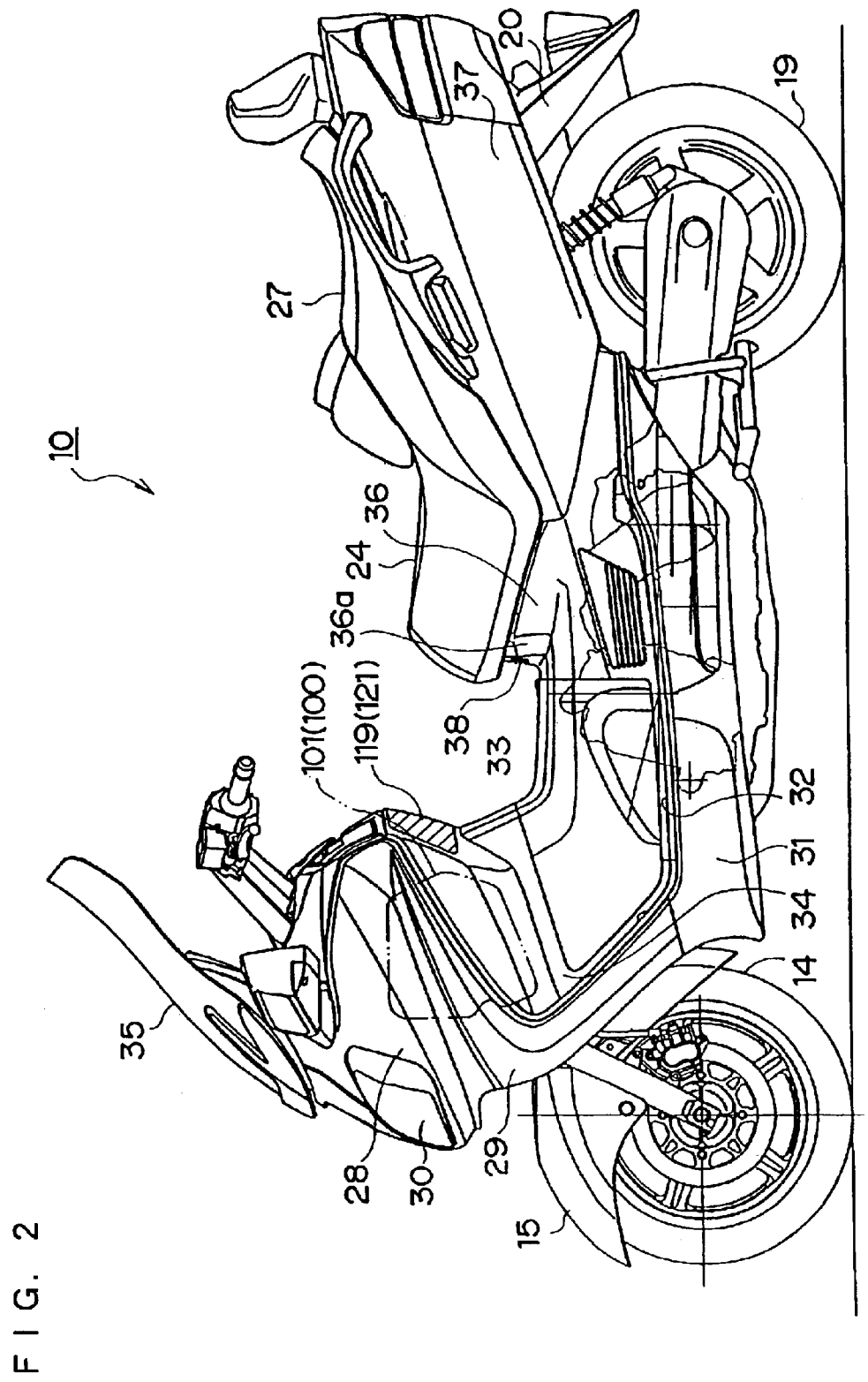
FIG. 2 is a side view showing the overall external appearance of the scooter type vehicle according to the embodiment of the air intake system structure for the scooter type vehicle of the present invention.

The present invention is effectively applicable to various gasoline engines mounted in motorcycles and the like. In this embodiment, as shown in FIGS. 1 and 2, the present invention is applied to an engine of a so-called scooter type vehicle.

First, the overall arrangement of a scooter type vehicle 10 according to this embodiment will be explained. Referring to FIG. 1, in the front portion of a body frame made of steel or an aluminum alloy, two front forks 11 so supported by a steering head pipe as to be able to pivot to the right and left are formed. A handle 12 is fixed to the upper ends of the front forks 11, and grips 13 are attached to the two ends of the handle 12. A front wheel 14 is rotatably supported by the lower portions of the front forks 11. A front fender 15 is so fixed as to cover the upper portion of the front wheel 14. The front wheel 14 has a brake disk 16 which rotates together with the front wheel 14.

In the rear portion of the body frame, right and left swing arms 17 are formed to be swingable. A rear shock absorber 18 is inserted between the body frame and each swing arm 17. One (the left one) of the swing arms 17 also functions as a power transmitting mechanism made up of a plurality of gears. A rear wheel 19 is rotatably supported by the rear ends of the swing arms 17, and rotated via the power transmitting mechanism described above. A rear fender 20 is so fixed as to cover the upper portion of the rear wheel 19.

To an engine unit 21 mounted on the body frame, a gas mixture is supplied from an air intake system including an air cleaner unit (to be described later) and the like. Also, combusted exhaust gas is exhausted from the engine unit 21 through an exhaust pipe 22. The engine unit 21 is so mounted that its cylinder axis is substantially horizontal and slightly inclined forward and upward. The engine unit 21 is placed in a floor tunnel and covered with a floor tunnel cover as will be described later. A radiator unit 23 is placed in front of the engine unit 21. A fuel tank 25 is placed after the engine unit 21 and under a driver's seat 24. A battery 26 is mounted in front of the fuel tank 25. A tandem seat 27 connects to the back of the driver's seat 24.

The vehicle's main constituent members including the engine unit 21 and the like are covered with a body cover. As shown in FIG. 2, therefore, the external appearance of the vehicle is neat and streamlined. That is, an upper front cowl 28 and lower front cowl 29 are connected in the front portion of the vehicle, and a head lamp 30 is embedded in the upper front cowl 28. An under cover 31 is connected to the lower portion of the lower front cowl 29.

Right and left low-floor footrests 32 are provided between a front wheel steering unit including the front forks 11, handle 12, and the like and the driver's seat 24. A driver can sit on the driver's seat 24 while resting his or her feet on the footrests 32. A floor tunnel projecting upward is formed between the right and left footrests 32. The engine unit 21 is placed in this floor tunnel and covered with a floor tunnel cover 33. A leg shield 34 connects to the front edges of the footrests 32 and floor tunnel cover 33.

A window screen 35 stands upright on the upper portion of the upper front cowl 28. The window screen 35, upper front cowl 28, and lower front cowl 29 are so formed as to cover, from the front, at least the upper half of the driver's body and the front body portion including the handle 12 and the like.

This vehicle also includes a front frame cover 36 which connects to the rear edge of the floor tunnel cover 33 in or near the rear body portion, and which has a rising portion 36a which rises toward the lower edge of the driver's seat 24. In substantially the center of the rising portion 36a, an exhaust port 38 which opens forward is formed. Right and left side frame covers 37 connect to the rear side of the front frame cover 36.

The various body covers described above are basically made of a synthetic resin and fixed to the body frame directly or indirectly via support members such as brackets. Although the engine unit 21 and the like are housed inside these body covers, an air flow path in which air flows from the front to the rear of the vehicle is formed inside the body covers while the vehicle is running.

Figure 3:
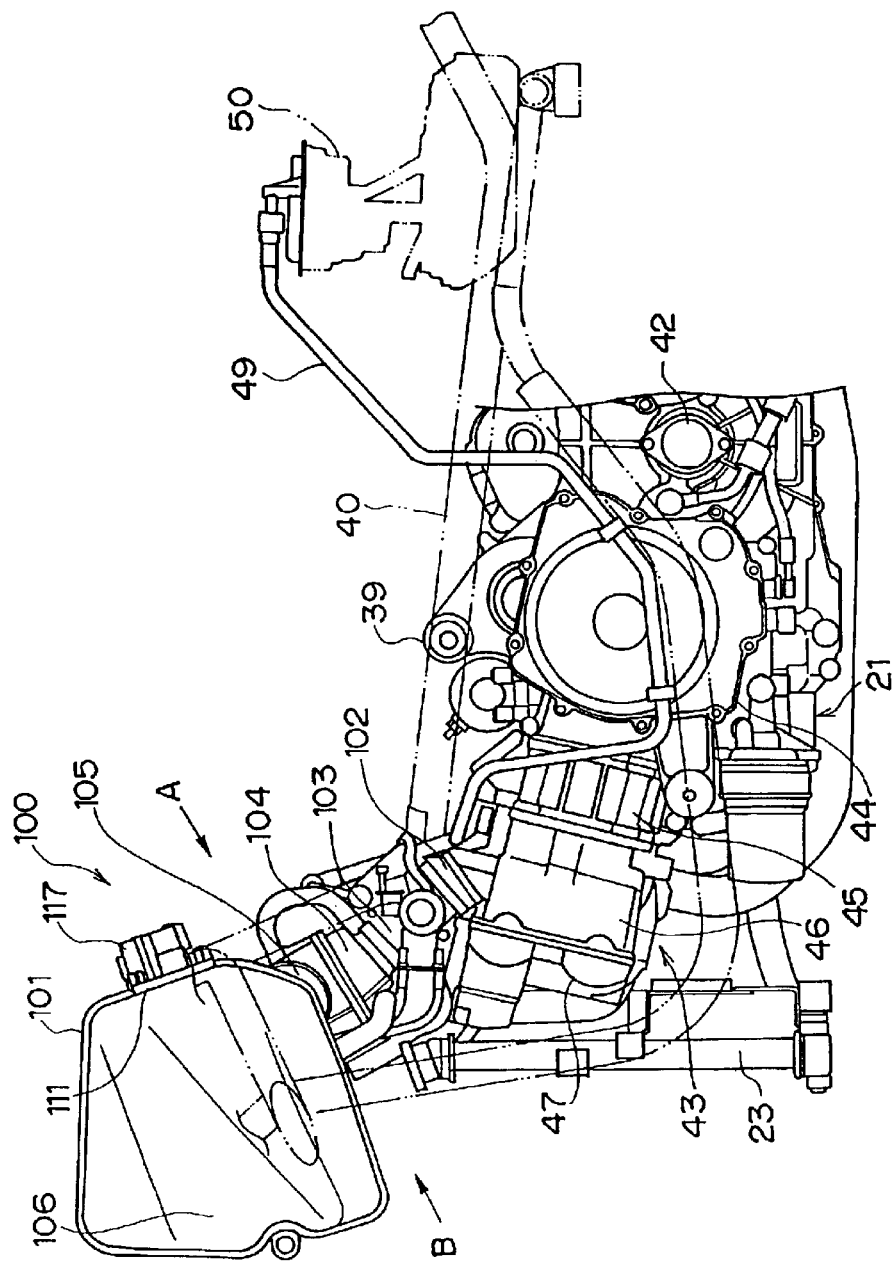
FIG. 3 is a perspective view showing an engine unit and its vicinity in the embodiment of the air intake system structure for the scooter type vehicle of the present invention.
Figure 4:
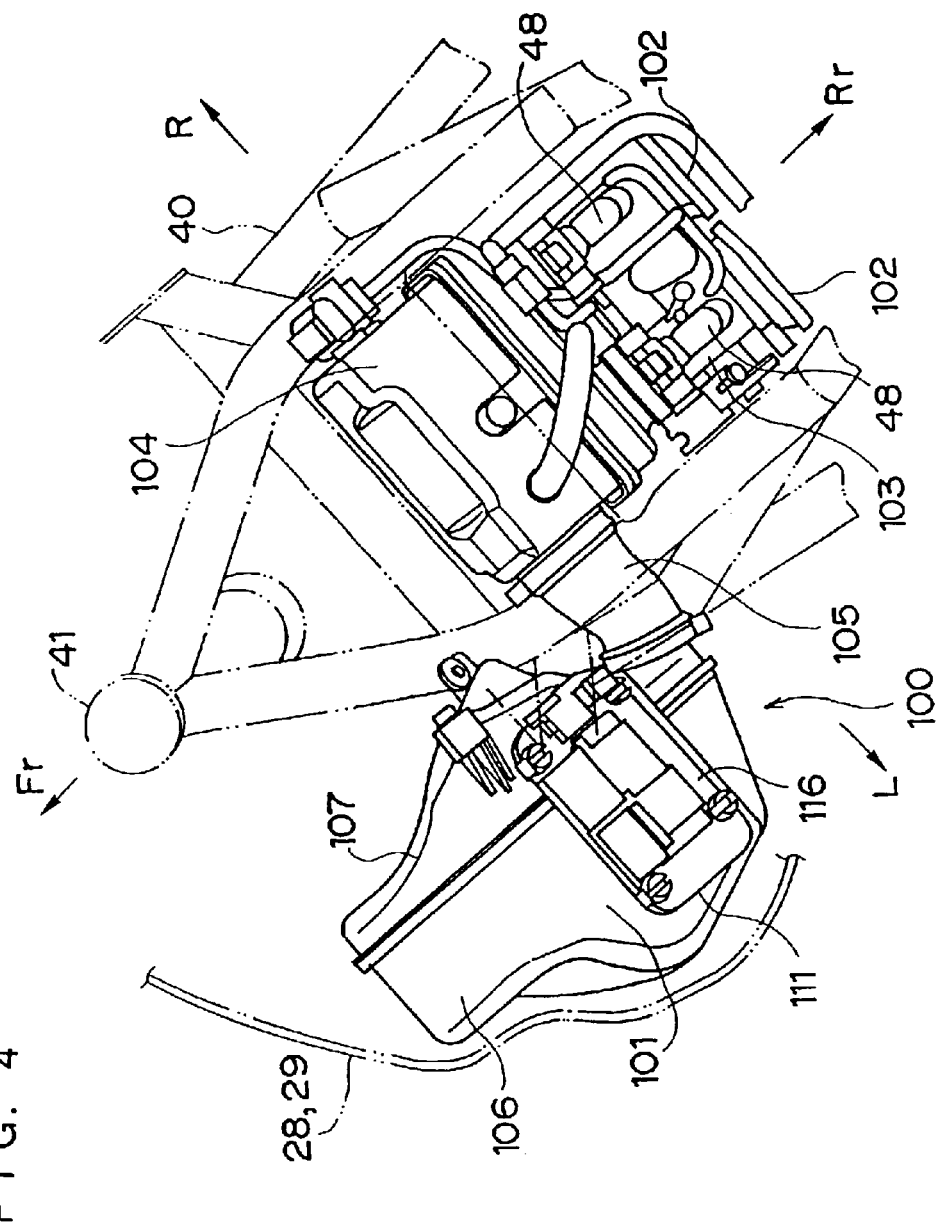
FIG. 4 is a view taken along the direction of an arrow A in FIG. 3.
Figure 5:
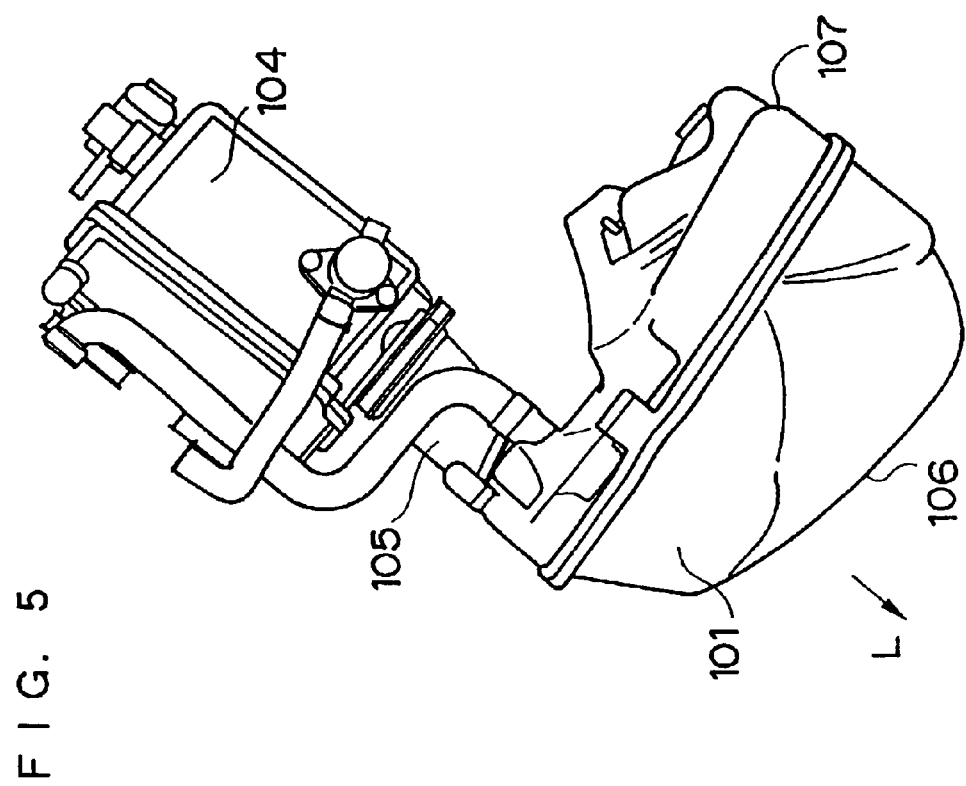
FIG. 5 is a view taken along the direction of an arrow B in FIG. 3.

FIGS. 3 and 4 illustrate the arrangement of the engine unit 21 and its vicinity. As shown in FIG. 3, the engine unit 21 is mounted on a predetermined portion of a body frame 40 via a plurality of engine mount members 39. As described previously, the front forks 11 are pivotally supported in the front portion of the body frame 40 via a steering head pipe 41 (FIG. 4). A transmission unit 42 and the like are integrated with the rear portion of the engine unit 21, thereby forming a power unit for driving the vehicle.

The engine unit 21 includes an engine 43 and the radiator unit 23. In the engine 43, a crankcase 44, cylinder block 45, cylinder head 46, and cylinder head cover 47 are integrated. Also, since the engine is a type of water cooling engine in this embodiment, the engine unit 21 includes the radiator unit 23 in front of the cylinder head cover 47. In this way, the engine unit 21 is supported on the body frame 40, and the front body portion is covered with the cowling.

In the air intake system structure of the present invention, the cowling (upper front cowl 28 and lower front cowl 29) is made wider than the body frame 40 to form a space in the body widthwise direction between the body frame 40 and cowling. As shown in FIG. 2, an air cleaner unit 101 forming an air intake system 100 is accommodated in this space.

The leg shield 34 is formed by extending a portion of the cowling downward in front of the air cleaner unit 101. In addition, the driver's space (the footrests 32 and the space above them) is formed below the air cleaner unit 101.

In the principal arrangement of the air intake system 100, as shown in FIGS. 3 and 4, an air intake pipe 102 is connected to the engine unit 21 accommodated within the width of the body frame 40, and a throttle body 103 is attached to the air intake pipe 102. In addition, an air chamber 104 is connected to the upstream side of the throttle body 103 and accommodated within the width of the body frame 40. In this arrangement, the air cleaner unit 101 is placed in one (in this embodiment, the left (L) one) of the two outside spaces of the body frame 40. In an appropriate portion outside the body frame 40, the air cleaner unit 101 is connected to the air chamber 104 via a joint tube 105.

Referring to FIG. 4, arrows Fr, Rr, R, and L indicate the front, rear, right side, and left side, respectively.

The throttle body 103 includes injectors 48 (FIG. 4). Fuel is supplied to the injectors 48 from a fuel pump 50 via a fuel tube 49, and injected toward the downstream side of the throttle valve. In this embodiment, the fuel pump 50 is a so-called in-tank type pump installed inside the fuel tank 25. A fuel supply system is formed by these members.

Figure 6A:
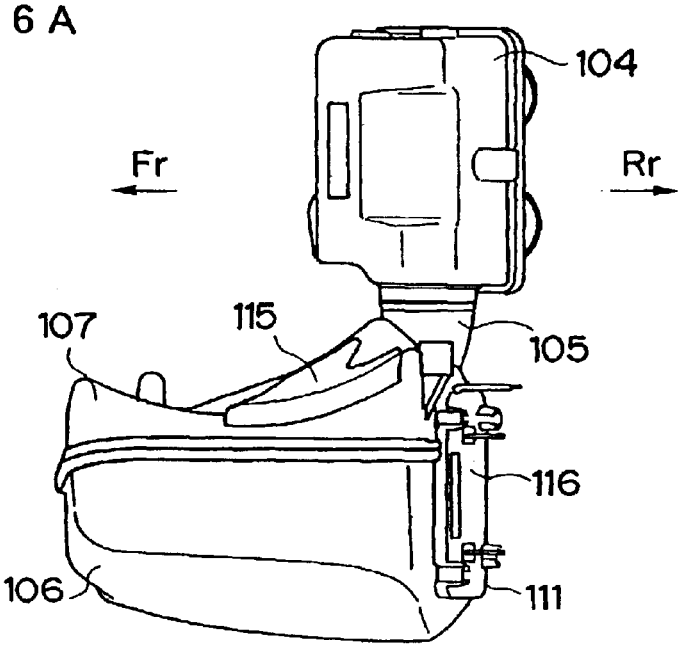
FIGS. 6A, 6B, and 6C are views showing an example of the arrangement of an air cleaner unit according to the embodiment of the air intake system structure for the scooter type vehicle of the present invention.
Figure 6B:
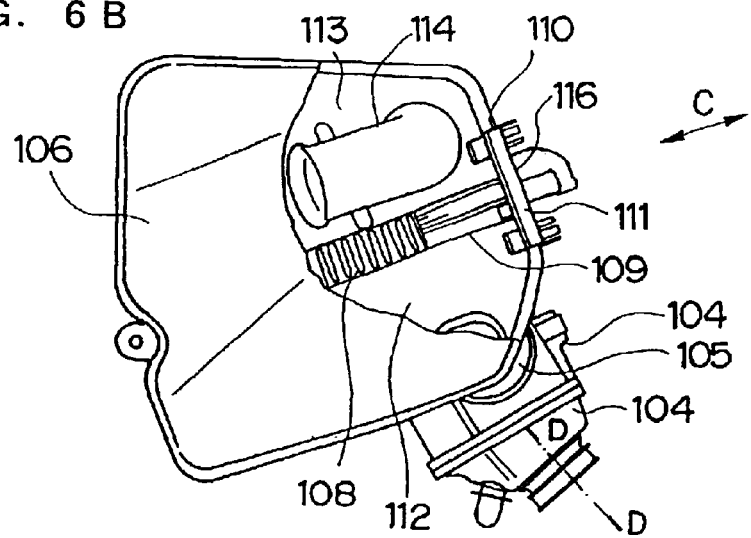

As shown in FIGS. 5 and 6A to 6C, the air cleaner unit 101 is formed by closing an outer case 106 and inner case 107 together, and has a substantially flat filter 108, filter support portion (partition) 109, and filter insertion hole 110. The filter insertion hole 110 is closed with a detachable air cleaner lid member 111. As shown in FIG. 6B, the attachment direction or insertion/removal direction (arrow C) of the filter 108 is set in the plate surface (longitudinal) direction of the filter 108, and the filter insertion hole 110 is formed in a position corresponding to the end face of the filter 108 when it is attached.

The filter 108 has a substantially rectangular shape and is detachably attached in the direction of arrow C. As shown in FIG. 6B, the filter 108 is appropriately obliquely inserted downward and removed upward in the longitudinal direction of the vehicle. The long side of the rectangle is set in the insertion/removal direction along the longitudinal direction of the filter 108, and the short side of the rectangle is set in the vehicle widthwise direction. When the filter 108 is inserted, the short side at the rear end is fixed by the air cleaner lid member 111. Also, the filter 108, filter support portion 109, and air cleaner lid member 111 divide the air cleaner main body into a clean chamber 112 and dirty chamber 113. The upper portion is the dirty chamber 113.

As shown in FIG. 6B and the like, the bottom surface of the air cleaner main body of the air cleaner unit 101 is an inclined surface which rises toward the back. In the vicinity of this bottom surface, the air cleaner unit 101 is connected to the air chamber 104 via the joint tube 105. In the vicinity of the upper rear end of the air cleaner main body, which forms the dirty chamber 113, an air intake upstream side opening is formed inside the vehicle widthwise direction. An inlet tube 114 extends into the dirty chamber 113 through this opening.

Around this air intake upstream side opening, a shielding plate 115 is formed along the outer surface shape of the inner case 107. The air intake path of the air intake system formed along the inlet tube 114, joint tube 105, and air intake pipe 102 is laid out to be substantially straight when viewed from the side. This air intake path has a substantially S shape when viewed from the front. In addition, even when the flow of air from this air cleaner is viewed three-dimensionally, the air flow reaches the engine combustion chamber in a form obtained by partially bending the S shape. That is, the air intake path is a very simple path.

Also, as shown in FIG. 4, the outer surface of the outer case 106 is curved along the inner surface shape of the cowling (upper front cowl 28 or lower front cowl 29). The outer surface of the inner case 107 is typically curved into a cylindrical shape so as not to interfere with the locus of pivoting motion of the steering unit (front forks 11) which pivots on the steering head pipe 41. Since the air cleaner unit 101 is formed in this way, the air cleaner unit 101 which is long in the longitudinal direction and vertical direction and narrow in the widthwise direction can be housed in the internal space of the cowling with a high space efficiency, while collisions against other members are avoided. In this structure, as described above, the air intake upstream side opening and the opening for connection to the air chamber 104 are formed inside the air cleaner unit 101, i.e., in the inner case 107.

As shown in FIGS. 6A and 6B, the air cleaner lid member 111 is a member which is long in the vehicle widthwise direction and short in the vertical direction, and fixed to the outer case 106 and inner case 107 by a plurality of screws. A circular protrusion stands upright around each screw. A mounting support portion 116 for mounting electric parts is formed outside the air cleaner lid member 111. In about the middle of the air cleaner lid member 111, an electric part mounting tongue stands upright from the mounting support portion 116. A fuse box 117 as an electric part is directly engaged with this tongue, or fixed to the tongue by using a clamp or the like.

Figure 6C:
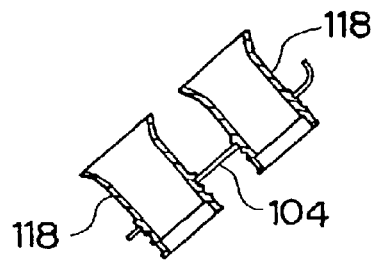

As described above, the air cleaner unit 101 and air chamber 104 are connected via the joint tube 105. The air chamber 104 has a substantially boxy shape and prevents pulsation of air in the air intake system. One end of the upper portion of the air chamber 104 which extends in the vehicle widthwise direction is connected to the air cleaner unit 101 via the joint tube 105. The lower portion of the air chamber 104 branches into a plurality of portions. In this embodiment, as shown in FIG. 6C, the air chamber 104 branches into two outlet tubes 118. Each outlet tube 118 connects to the throttle body 103.

Figure 7:
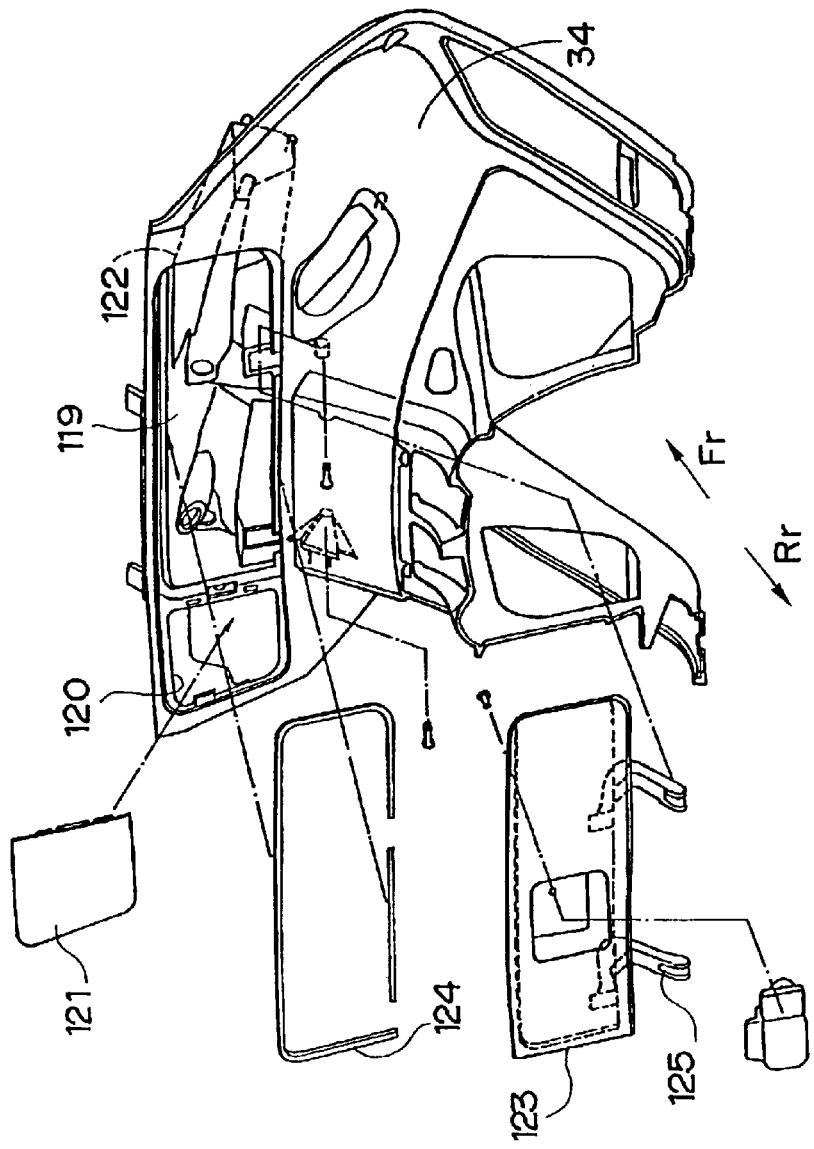
FIG. 7 is an exploded perspective view showing an example of the arrangement of a leg shield according to the embodiment of the air intake system structure for the scooter type vehicle of the present invention.

The leg shield 34 is connected to the cowling accommodating the air cleaner unit 101 and the like, and these members are arranged to have a positional relationship as roughly shown in FIG. 2. FIG. 7 shows a practical example of the arrangement of the leg shield 34. The leg shield 34 basically has a symmetrical shape with respect to the longitudinal axis of the vehicle. In the vicinity of an upper portion closer to the left side, however, a box cover 119 (hatched portion) as a cover member for covering at least the rear portion of the air cleaner unit 101 is formed. In the box cover 119, a maintenance hole 120 is formed in the direction in which the filter 108 and air cleaner lid member 111 are arranged. Additionally, the box cover 119 has a maintenance lid 121 which is detachable from the maintenance hole 120. The fuse box 117 is placed between the air cleaner lid member 111 and maintenance lid 121.

A utility box 122 is formed in an internal space on principally the right side of the box cover 119. A cover 123 is attached to this utility box 122 yin a packing 124. The cover 123 is pivotally supported via hinge arms 125, and normally closes the utility box 122. In this embodiment, the cover member is substantially made up of the maintenance lid 121 and cover 123.

In the present invention having the above arrangement, the cowling is made wider than the body frame 40 to form a space in the vehicle widthwise direction between the body frame 40 and cowling, and the air cleaner unit 101 is accommodated in this space. In this manner, the air cleaner unit 101 is appropriately and efficiently placed in the internal space of the cowling. Therefore, even when the projected area of the cowling is large, it is possible to effectively mount the air cleaner unit 101 without wasting any space, and effectively and appropriately ensure the capacity of the air cleaner unit 101.

The air cleaner unit 101 has the filter 108, filter support portion 109, and filter insertion hole 110. The attachment direction of the filter 108 is set in its plate surface (longitudinal) direction, and the filter insertion hole 110 is formed a position corresponding to the end face of the filter 108 when it is attached. The air cleaner lid member 111 is attached to the filter insertion hole 110. The maintenance hole 120 and its maintenance lid 121 are formed behind the air cleaner lid member 111.

For example, when a filter element of the filter 108 is to be replaced, the replacement work can be smoothly and easily performed through the maintenance hole 120 formed behind the air cleaner unit 101. Also, replacement, repair, and the like of electric parts such as the fuse box 117 can be simply and accurately performed only by opening the maintenance hole 120.

By forming a support bracket for electric parts such as the fuse box 117 on the air cleaner lid member 111, it is possible to substantially reduce the number of parts and reduce the weight of the air cleaner unit 101.

In the box cover 119 covering the rear portion of the air cleaner unit 101, the maintenance hole 120 and its maintenance lid 121 are formed in the direction of arrangement of the filter 108 and air cleaner lid member 111. This reduces the area required when the filter 108 or air cleaner lid member 111 is attached or detached. Accordingly, the shapes of the maintenance hole 120 and maintenance lid 121 can be freely set, so a good external appearance can be obtained.

The air chamber 104 is housed within the width of the body frame 40, and the air cleaner unit 101 is placed in the outside space of the body frame 40, i.e., the air intake system is separated into portions inside and outside the body frame 40. Therefore, the length and height of the air intake system inside the body frame 40 can be decreased. Also, since the air cleaner unit 101 is juxtaposed outside the body frame 40, the length of the air intake system can be decreased. This achieves space saving, light weight, and the like.

The air cleaner unit 101 is formed to be long in the longitudinal direction and vertical direction and narrow in the widthwise direction, the leg shield 34 is formed by extending a portion of the cowling downward, and the driver's space is formed below the air cleaner unit 101. In this way, while the space occupied by the driver is ensured, a large-capacity air cleaner can be installed by effectively using the remaining space. Also, since the air cleaner 101 is long in the longitudinal direction, a necessary and sufficient surface area can be assured even when the filter element is narrow. This ensures the original air cleaning function of the air cleaner unit 101.

Furthermore, the external appearance of the cowling is substantially symmetrical. Inside this cowling, however, the air cleaner unit 101 is formed on the left side, and the utility box 122 and the like are formed on the right side. That is, even when the air cleaner unit 101 is thus formed on one side, the other side can be used as a utility box and the like, thereby effectively and efficiently using the space.

The present invention has been explained above together with its various embodiments. However, the present invention is not limited to these embodiments and can be changed within the scope of the invention.

For example, although the air cleaner unit 101 is formed on the left side, it may also be formed on the right side. Alternatively, two air cleaner units may be formed on both sides. In this case, the air cleaner capacity can be well increased, and the air intake noise and air intake resistance can be effectively reduced.

In the present invention as has been described above, in an air intake system structure of a scooter type vehicle of this sort, a cowling is made wider than a body frame to form a space in the vehicle widthwise direction between the body frame and cowling, and an air cleaner unit is accommodated in this space. In this manner, the air cleaner unit can be effectively mounted while the space is effectively utilized, and the capacity of the air cleaner unit can be effectively and appropriately assured. In addition, the ease of maintenance can be greatly improved by improving the arrangement of a filter and air cleaner lid member or a maintenance hole and its maintenance lid.

What is claimed is:

1. An air intake system structure for supplying air to an engine unit of a scooter type vehicle in which said engine unit is supported on a body frame comprising:

a front body portion covered with a cowling, said cowling is made wider than said body frame to form a space in a vehicle widthwise direction between said body frame and said cowling, and an air cleaner unit is accommodated in said space outside of said body frame, wherein said body frame comprises a right side and a left side; and said air cleaner unit is accommodated in said space outside of one of said right side and said left side of said body frame in said vehicle widthwise direction between said body frame and said cowling.

2. The air intake system structure according to claim 1, wherein:

said air cleaner unit comprises a substantially flat filter, a filter support portion, and a filter insertion hole, an attachment direction of said filter is set in a longitudinal direction thereof, said filter insertion hole is formed in a position corresponding to an end face of said filter when said filter is attached, and said filter, said filter support portion, and an air cleaner lid member divide an air cleaner main body into a clean chamber and dirty chamber.

3. The air intake system structure according to claim 2, further comprising a mounting support portion for mounting a fuse box outside said air cleaner lid member.

4. The air intake system structure according to claim 3, further comprising a cover member connected to said cowling and covering a rear portion of said air cleaner unit, and a maintenance hole and a maintenance lid thereof are formed in a direction of arrangement of said filter and said air cleaner lid member.

5. The air intake system structure according to claim 4, wherein:

an air intake system including an air intake pipe is connected to said engine unit mounted within a width of said body frame, an air chamber is connected to an upstream side of said air intake pipe and housed within the width of said body frame, said air cleaner unit is placed in at least one of two outside spaces of said body frame, and said air cleaner unit is connected to said air chamber in a portion of said body frame between said air cleaner unit and said air chamber.

6. The air intake system structure according to claim 5, wherein:
- a portion of said cowling for accommodating said air cleaner unit is formed to be long in a longitudinal direction and vertical direction and narrow in the widthwise direction,
- said portion of said cowling for accommodating said air cleaner unit is in front of said air cleaner and is partially extended downward to form a leg shield, and
- a space is formed below said air cleaner unit and above a footrest.

7. The air intake system structure according to claim 2, further comprising a cover member connected to said cowling and covering a rear portion of said air cleaner unit, and a maintenance hole and a maintenance lid thereof are formed in a direction of arrangement of said filter and said air cleaner lid member.

8. The air intake system structure according to claim 2, wherein:
- a portion of said cowling for accommodating said air cleaner unit is formed to be long in a longitudinal direction and vertical direction and narrow in the widthwise direction,
- said onion of said cowling for accommodating said air cleaner unit is in front of said air cleaner and is partially extended downward to form a leg shield, and
- a space is formed below said air cleaner unit and above a footrest.

9. The air intake system structure according to claim 2, wherein said air cleaner unit is placed on one side of the vehicle in the vehicle widthwise direction, and a utility box is formed in a space on another side of the vehicle.

10. The air intake system structure according to claim 7, wherein:
- an air intake system including an air intake pipe is connected to said engine unit mounted within a width of said body frame,
- an air chamber is connected to an upstream side of said air intake pipe and housed within the width of said body frame,
- said air cleaner unit is placed in at least one of two outside spaces of said body frame, and
- said air cleaner unit is connected to said air chamber in a portion of said body frame between said air cleaner unit and said air chamber.

11. The air intake system structure according to claim 10, wherein:
- a portion of said cowling for accommodating said air cleaner unit is formed to be long in a longitudinal direction and vertical direction and narrow in the widthwise direction,
- said portion of said cowling for accommodating said air cleaner unit is in front of said air cleaner and is partially extended downward to form a leg shield, and
- a space is formed below said air cleaner unit and above a footrest.

12. The air intake system structure according to claim 7, wherein:
- a portion of said cowling for accommodating said air cleaner unit is formed to be long in a longitudinal direction and vertical direction and narrow in the widthwise direction,
- said portion of said cowling for accommodating said air cleaner unit is in front of said air cleaner and is partially extended downward to form a leg shield, and
- a space is formed below said air cleaner unit and above a footrest.

13. The air intake system structure according to claim 2, wherein:
- an air intake system including an air intake pipe is connected to said engine unit mounted within a width of said body frame,
- an air chamber is connected to an upstream side of said air intake pipe and housed within the width of said body frame,
- said air cleaner unit is placed in at least one of two outside spaces of said body frame, and
- said air cleaner unit is connected to said air chamber in a portion of said body frame between said air cleaner unit and said air chamber.

14. The air intake system structure according to claim 13, wherein:
- a portion of said cowling for accommodating said air cleaner unit is formed to be long in a longitudinal direction and vertical direction and narrow in the widthwise direction,
- said portion of said cowling for accommodating said air cleaner unit is in front of said air cleaner and is partially extended downward to form a leg shield, and
- a space is formed below said air cleaner unit and above a footrest.

15. The air intake system structure according to claim 3, wherein:
- an air intake system including an air intake pipe is connected to said engine unit mounted within a width of said body frame,
- an air chamber is connected to an upstream side of said air intake pipe and housed within the width of said body frame,
- said air cleaner unit is placed in at least one of two outside spaces of said body frame, and
- said air cleaner unit is connected to said air chamber in a portion of said body frame between said air cleaner unit and said air chamber.

16. The air intake system structure according to claim 15, wherein:
- a portion of said cowling for accommodating said air cleaner unit is formed to be long in a longitudinal direction and vertical direction and narrow in the widthwise direction,
- said portion of said cowling for accommodating said air cleaner unit is in front of said air cleaner and is partially extended downward to form a leg shield, and
- a space is formed below said air cleaner unit and above a footrest.

17. The air intake system structure according to claim 3, wherein:
- a portion of said cowling for accommodating said air cleaner unit is formed to be long in a longitudinal direction and vertical direction and narrow in the widthwise direction,
- said portion of said cowling for accommodating said air cleaner unit is in front of said air cleaner and is partially extended downward to form a leg shield, and
- a space is formed below said air cleaner unit and above a footrest.

18. The air intake system structure according to claim 4, wherein:
- a portion of said cowling for accommodating said air cleaner unit is formed to be long in a longitudinal direction and vertical direction and narrow in the widthwise direction, said portion of said cowling for accommodating said air cleaner unit is in front of said air cleaner and is partially extended downward to form a leg shield, and a space is formed below said air cleaner unit and above a footrest.

19. The air intake system structure according to claim 1, wherein:

an air intake system including an air intake pipe is connected to said engine unit mounted within a width of said body frame, an air chamber is connected to an upstream side of said air intake pipe and housed within the width of said body frame, said air cleaner unit is placed in at least one of two outside spaces of said body frame, and said air cleaner unit is connected to said air chamber in a portion of said body frame between said air cleaner unit and said air chamber.

20. The air intake system structure according to claim 19, wherein:

a portion of said cowling for accommodating said air cleaner unit is formed to be long in a longitudinal direction and vertical direction and narrow in the widthwise direction, said portion of said cowling for accommodating said air cleaner unit is in front of said air cleaner and is partially extended downward to form a leg shield, and a space is formed below said air cleaner unit and above a footrest.

21. The air intake system structure according to claim 1, wherein:

a portion of said cowling for accommodating said air cleaner unit is formed to be long in a longitudinal direction and vertical direction and narrow in the widthwise direction, said portion of said cowling for accommodating said air cleaner unit is in front of said air cleaner and is partially extended downward to form a leg shield, and a space is formed below said air cleaner unit and above a footrest.

22. The air intake system structure according to claim 1, wherein said air cleaner unit is placed on one side of the vehicle in the vehicle widthwise direction, and a utility box is formed in a space on another side of the vehicle.

23. The air intake system structure according to claim 1, wherein said engine unit is accommodated within a width of said body frame.

* * * * *

UNITED STATES PATENT AND TRADEMARK OFFICE
CERTIFICATE OF CORRECTION

PATENT NO.   : 6,920,950 B2
DATED        : July 26, 2005
INVENTOR(S)  : Yuji Sonoda It is certified that error appears in the above-identified patent and that said Letters Patent is hereby corrected as shown below:

<u>Title page,</u>
Item [75], Inventors, please delete "Yuji Sonoda, Hammatsu (JP)" and substitute
-- Yuji Sonoda, Hamamatsu (JP) --.

Signed and Sealed this

Eleventh Day of October, 2005

JON W. DUDAS
*Director of the United States Patent and Trademark Office*